STEERABLE ANTENNA ARRAY AND METHOD OF OPERATING THE SAME

Filed Sept. 16, 1957 8 Sheets-Sheet 1

INVENTORS
JOHN W. MARCHETTI
WILLIAM P. GOLDBERG
JOHN RUZE
CHALONER B. SLADE
BY Alden D Redfield
Warren Kurtz
ATTORNEYS

STEERABLE ANTENNA ARRAY AND METHOD OF OPERATING THE SAME

Filed Sept. 16, 1957 8 Sheets-Sheet 2

INVENTORS
JOHN W. MARCHETTI
WILLIAM P. GOLDBERG
JOHN RUZE
CHALONER B. SLADE

BY

Alden D Redfield
Warren Kunz
ATTORNEYS

| | COL 1 | COL 2 | COL 3 | COL 4 | COL 5 |
|---|---|---|---|---|---|
| ROW 1 | H + V | 2H + V | 3H + V | 4H + V | 5H + V |
| ROW 2 | H + 2V | 2H + 2V | 3H + 2V | 4H + 2V | 5H + 2V |
| ROW 3 | H + 3V | 2H + 3V | 3H + 3V | 4H + 3V | 5H + 3V |
| ROW 4 | H + 4V | 2H + 4V | 3H + 4V | 4H + 4V | 5H + 4V |

| | COL 1 | COL 2 | COL 3 | COL 4 | COL 5 |
|---|---|---|---|---|---|
| ROW 1 | 10° | 15° | 20° | 25° | 30° |
| ROW 2 | 15° | 20° | 25° | 30° | 35° |
| ROW 3 | 20° | 25° | 30° | 35° | 40° |
| ROW 4 | 25° | 30° | 35° | 40° | 45° |

JOHN W. MARCHETTI
WILLIAM P. GOLDBERG
JOHN RUZE
CHALONER B. SLADE
*INVENTORS*

BY Alden D Redfield
Warren Kunz
ATTORNEYS

INVENTORS
JOHN W. MARCHETTI
WILLIAM P. GOLDBERG
JOHN RUZE
CHALONER B. SLADE
BY Alden D. Redfield
Warren Kunz
ATTORNEYS INVENTORS
JOHN W. MARCHETTI
WILLIAM P. GOLDBERG
JOHN RUZE
CHALONER B. SLADE
BY Alden D. Redfield
Warren Kunz
ATTORNEYS INVENTORS
JOHN W. MARCHETTI
WILLIAM P. GOLDBERG
JOHN RUZE
CHALONER B. SLADE
BY Alden D. Redfield
Warren Kunz
ATTORNEYS

STEERABLE ANTENNA ARRAY AND METHOD OF OPERATING THE SAME

JOHN W. MARCHETTI
WILLIAM P. GOLDBERG
JOHN RUZE
CHALONER B. SLADE
INVENTORS

BY Alden D Redfield
Warren Kunz
ATTORNEYS

Feb. 28, 1967 J. W. MARCHETTI ET AL 3,307,188

STEERABLE ANTENNA ARRAY AND METHOD OF OPERATING THE SAME

Filed Sept. 16, 1957

8 Sheets-Sheet 8

INVENTORS
JOHN W. MARCHETTI
WILLIAM P. GOLDBERG
JOHN RUZE
CHALONER B. SLADE

BY Alden D. Redfield
Warren Kunz
ATTORNEYS

United States Patent Office 3,307,188

Patented Feb. 28, 1967

3,307,188

STEERABLE ANTENNA ARRAY AND METHOD OF OPERATING THE SAME

John W. Marchetti, Lincoln, William P. Goldberg, North Woburn, John Ruze, South Acton, and Chaloner B. Slade, Bolton, Mass., assignors to Avco Manufacturing Corporation, Cincinnati, Ohio, a corporation of Delaware Filed Sept. 16, 1957, Ser. No. 684,366
28 Claims. (Cl. 343—100)

The present invention relates to an antenna and method of operating the same, and more particularly to a planar antenna array and its associated electronic components for generating a beam of radiant energy and steering it in space. Although not limited to such use, the invention finds particular utility in:

(1) Radar applications in which a beam of radiant energy is projected into space for locating distant objects; and (2) Tropospheric scatter link communication systems.

The invention also relates to electronic circuitry for selectively phasing the signals transmitted by individual radiators of an antenna array whereby steering of the radiated beam is effected. The circuitry is also adapted to phase-shift incoming signals after they are received, whereby efficient reception is assured.

The advent of intercontinental ballistic missiles has presented the problem of radar detection of enemy missiles at a range of two thousand miles or more. Since conventional radar equipment is unable to radiate sufficient power for such long range detection, it has become necessary to use a plurality of high powered radiators in an array or a very large reflector. Such an antenna, however, may be of such huge physical proportions as not to be rotatable for scanning and search purposes. To effect beam steering without movement of the array, we have invented a novel means for and method of phase shifting the signals radiated by the individual radiators of the array.

Briefly described, the present invention comprehends a planar antenna comprising an array of vertically and horizontally aligned radiators. With each radiator is associated transmitting and receiving equipment which is alternately energized through conventional transmit-receive switches (T-R switches).

Depending upon prevailing operational conditions, it may be desirable to use either vertical dipoles or horizontal dipoles as radiators. For convenience, therefore, both a vertical and a horizontal dipole are provided at each radiating point of the array and suitable switches are provided to convert from one dipole system to the other. The dipoles are oriented at 90° to one another and may be physically supported by a hollow cylinder which also houses the transmitting and receiving equipment.

During the transmission period, each radiator transmits a signal which, together with the signals from the other radiators, creates a well-defined directional beam of radiant energy. This beam may be steered in space for scanning a spherical sector entirely through selective phasing of the signals transmitted by the individual radiators. Such selective phasing may be accomplished either electro-mechanically, as by phase shifters, or by purely electronic means involving wave guides and mixer circuits or phase shifting networks and mixer circuits.

During a receiving period, essentially the same principles are employed, the T-R switches directing the incoming signals to the receivers associated with the radiators. These receivers amplify the signals and deliver them through phase shifting circuits to a master receiver where a greatly amplified, composite, in-phase signal is produced.

An advantage of the present invention is that, within its range of design frequencies, beam steering is not a function of the frequency of the signals transmitted or received. Thus, the transmitted frequency can be varied at will, as for anti-jamming, without appreciably affecting directional control of the beam. By the same token, the beam may be steered without affecting the frequency of the radiated signals, which may remain substantially constant.

An important object is to provide means for radiating a great deal of power in a well-defined beam. Similarly, it is an object of the invention to provide means having great sensitivity to incoming signals.

Another object of the invention is to provide a steerable antenna array, the radiated beam of which may be steered instantaneously in space.

Further objects of the invention comprehend:

(a) Provision of a planar antenna which can be easily constructed and maintained and built to huge proportions, if necessary, as for ICBM detection.

(b) Generation of a large radiated signal without need for a large generator or modulator.

(c) Provision of individual receivers and transmitters for each radiator of an array.

(d) Construction of an antenna which permits beam scanning without rotation of the physical antenna structure.

(e) Provision of an antenna of high power output having as advantageous a signal to noise ratio as conventional reflector type antenna systems.

(f) Provision of an antenna system which is economical to operate since its heat dissipation may be directly used for de-icing the antenna structure.

(g) Provision of an antenna system in which the heat of the transmitting and receiving equipment may be dissipated through the antenna structure.

(h) Provision of antenna system which is not readily susceptible to jamming (i) Provision of an antenna for radiating large amounts of power generated through through the use of conventional circuit elements.

(j) Provision of an antenna system which is not critical in its physical or electrical tolerance requirements.

(k) Provision of means for rapidly shifting from an array of horizontal dipoles to an array of vertical dipoles, or vice versa, to favor optimum operation of the antenna array.

For convenience, the antenna system is described with respect to radar applications, although it should be understood that it is not limited to such use but may be used for voice communication or in any other application requiring a directional beam of radiant energy. For instance, the invention is ideally suited for use in tropospheric scatter links where long distance communication around the curvature of the earth is accomplished by scatter propagation of radiated energy in the troposphere.

The novel features which we consider characteristic of our invention are set forth in the appended claims; the invention itself, however, both as to its organization and method of operation, together with additional objects and advantages thereof, will best be understood from the following description of a specific embodiment when read in conjunction with the accompanying drawings, in which:

*Steerable antenna array*

It is well known in the art that a broadside array of radiators can be energized to radiate a single narrow beam of radio frequency energy, and further, that the beam can be steered in space by exciting each radiator in the proper relative phase relationship. Such an antenna array is called a "steerable array" and constitutes the broad subject of this application.

Our broadside antenna array comprises a plurality of radiators preferably aligned in mutually perpendicular rows and columns. Each radiator may be separately excited to radiate a signal, which for convenience may be considered a sinusoidal wave, having a particular phase relation to the signals emanating from each of the other radiators of the array. By selective phasing, beam steering is effected. The beam shape may be chosen for the particular purpose involved, but for maximum range and definition is preferably pencil-shaped. It will be understood by those skilled in the art that such a beam may be used to scan a sector in space to detect the presence of aircraft or missiles.

Figure 1:
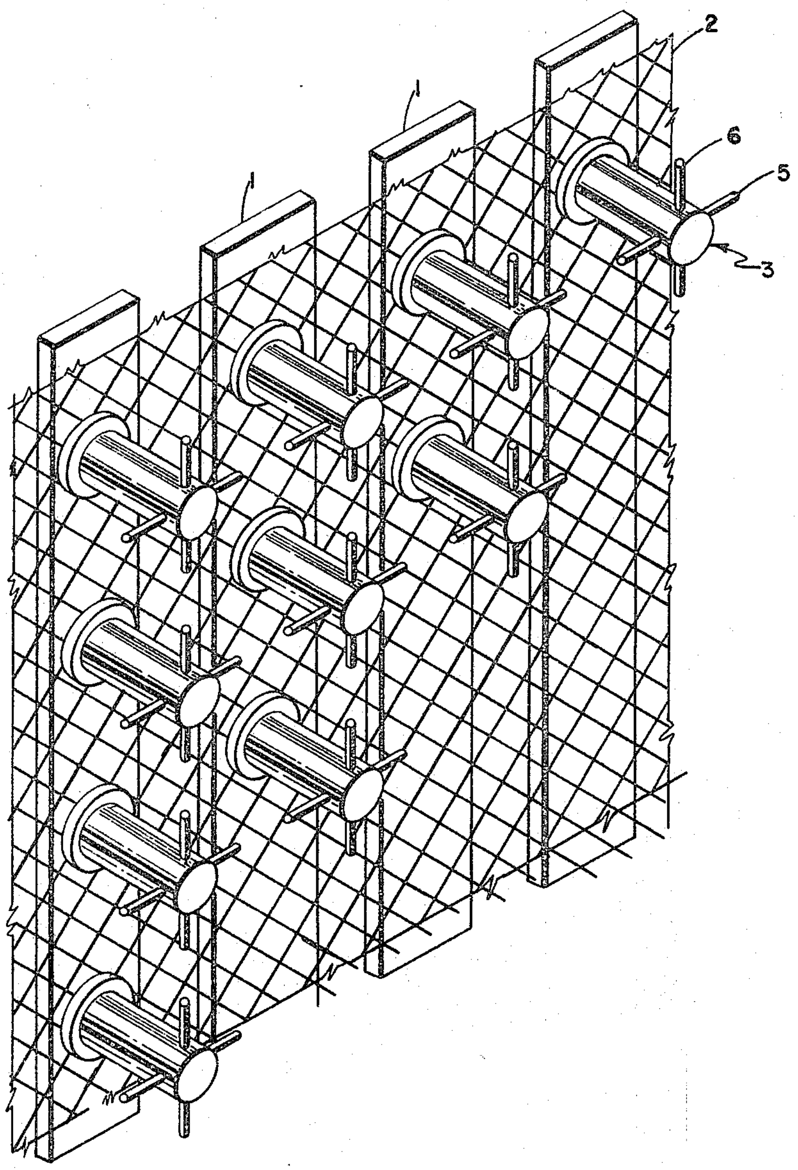
FIG. 1 is a schematic representation in perspective showing a portion of the antenna array with its associated radiators.

To form a background for more readily understanding the invention, attention is first directed to FIG. 1 showing co-planar stationary supports, 1 to which a reflector screen 2 is secured for reducing to a low value back radiation from a plurality of radiator assemblies, generally designated 3. It will be noted that the radiator assemblies are arranged in mutually perpendicular rows and columns in two dimensions. Obviously, the array may be positioned in any attitude in space as may be required for the purpose to be served. For convenience, however, the radiator assemblies will be deemed to be arranged in horizontal rows and vertical columns.

Each radiator assembly includes a pair of mutually perpendicular half-wave dipoles 5 and 6. As will be explained in greater detail hereinafter, the circuits associated with these dipoles are arranged so that at any one time only vertical, or only horizontal dipoles are in use, or both vertical and horizontal dipoles in quadrature are in use. The latter produces circular polarization.

Figure 2:
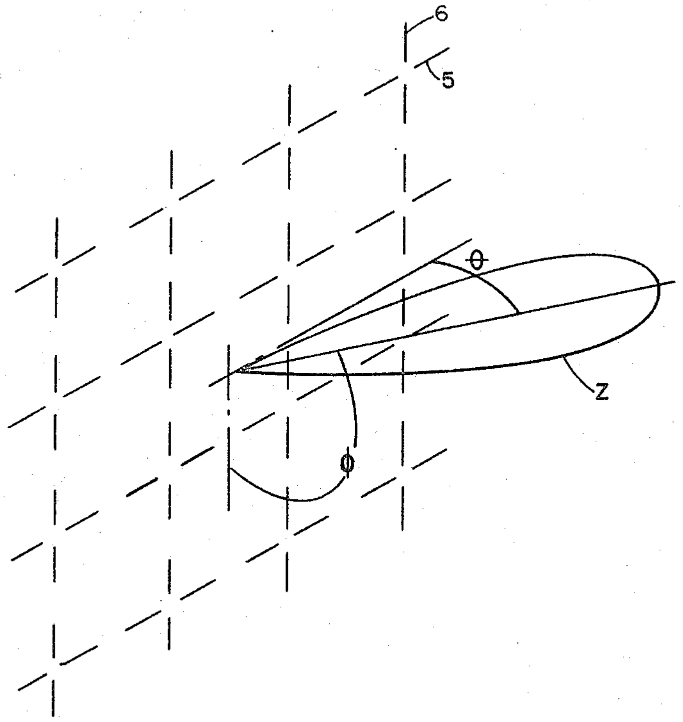
FIG. 2 is a diagrammatic representation of an array of dipoles such as included in the antenna array of FIG. 1.

For a better understanding of the basic principles of a steerable array, attention is now directed to FIG. 2, which shows in perspective a plurality of dipole sets arranged in columns and rows. It will be understood by those skilled in the art that each of the vertical (or of the horizontal) dipoles may be excited to radiate a sinusoidal wave in space, and the phase relationship of the individual radiated waves may be chosen so that the resultant composite beam of the combined signals is shaped and directed as desired.

For illustrative purposes, a pencil beam Z of radiant energy is shown being transmitted from the planar array of FIG. 2. It will be observed that the beam has a particular direction in space, making an angle of $\theta$ with the horizontal axis and an angle of $\phi$ with the verical axis of the array. In other words, the beam Z has a preferred position with respect to the two dimensions of the array. It should be emphasized that FIG. 2 is merely diagrammatic in nature; in practice, the lobe of beam Z would be very much larger in size than the array.

Figure 3:
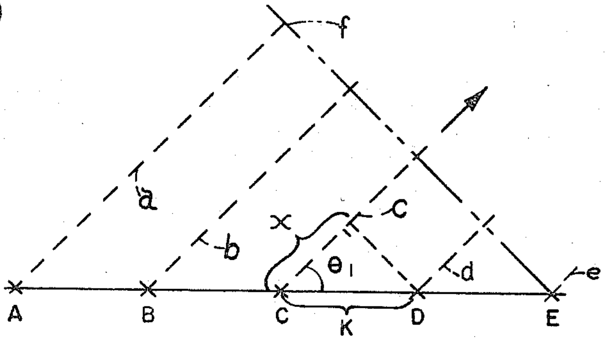
FIG. 3 is a diagrammatic representation of a linear array of radiators transmitting signals which are phase shifted to effect directional control.

To gain an understanding of beam steering through phase shifting, attention should now be directed to FIG. 3. A plurality of point sources of radiation A, B, C, D and E are shown in a linear array, such as might comprise any one row or column of the planar array shown in FIG. 1. By studying the operation of the linear array first, an appreciation of steering in one plane can be gained from which an understanding of steering in elevation as well as azimuth will readily follow.

Being point sources, which for purposes of discussion will be assumed to be backed by a reflecting surface to eliminate back radiation, each may be considered to radiate a spherical wave front. The signals from the various point sources tend to cancel in many directions but it will be found that they reinforce each other in other directions. The direction of maximum reinforcement represents the direction in which the composite beam is transmitted for practical purposes.

In FIG. 3, dash lines *a, b, c, d* and *e* have been used to indicate the direction of maximum reinforcement of the radiated signals from each of the point sources. These dash lines make an angle $\theta_1$ with the axis of the array, and phantom line *f* represents the composite wave front being transmitted by the array. It will be noted that the point sources are spaced at equal intervals *k*. This physical spacing of point sources causes the signal radiated from C, for example, to be delayed in the direction *c* relative to the signal from adjacent point source D. The size of the delay is proportional to distance *x* in FIG. 3, which is equal to $k \cos \theta_1$. In other words, the delay between adjacent radiated signals is a function not only of the angle $\theta_1$ under consideration but also the spacing *k* between adjacent point sources. It will also be apparent that if the signal radiated from D can be sufficiently delayed relative to signal from C, both signals travelling in directions *d* and *c* can be phased or brought into step so that they add directly along a line perpendicular to composite wave front *f*.

It is to be emphasized that in accordance with the present invention the frequency of all radiated signals is equal. Hence, the wave length of all signals is also equal and the necessary phase shift to bring the signals of successive point sources C and D into step will equal $(x/\lambda)2\pi$ radians, where $\lambda$ equals the wave length of the signal being radiated.

Since all of the point sources are equally spaced, the successive phase shifts of the signals radiated by adjacent point sources are identical, and in each instance equal an angular phase shift of $(x/\lambda)2\pi$ radians.

Assuming that the signals are being radiated from point sources A, B, C, D and E in the foregoing phase relationship, it will be found that any attempt to combine the signals in any other direction different from $\theta_1$ will yield a reduction of field strength. Hence, maximum beam radiation occurs in the direction of the dash lines making an angle of $\theta_1$ with the axis of the array.

These principles may be utilized for a linear array of point source radiators whether arranged vertically or horizontally, and the resultant steering of the composite radiated beam will be substantially the same. In a similar manner, it is posible to phase successively the radiators of rows and columns in a planar array to effect beam steering in space.

Figures 4A, 4B, 7:
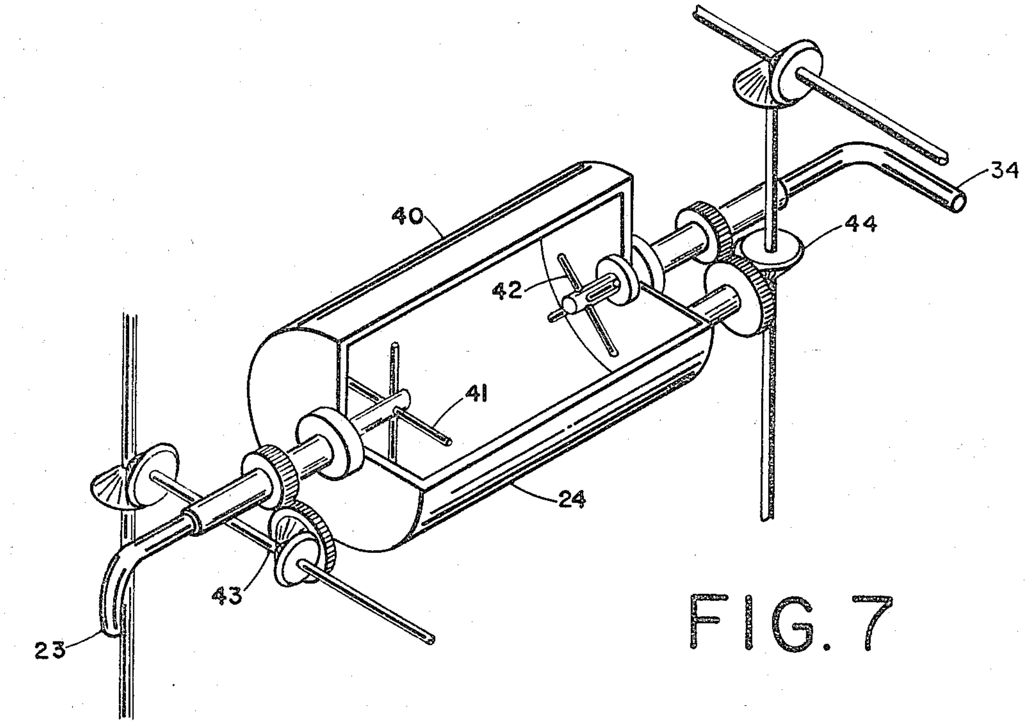
FIGS. 4A and 4B are charts representing the angular phase shifts of individual radiators of the array.
FIG. 7 is a perspective view of a mechanical phase shifter with a portion of its side wall cut away to illustrate the interior construction thereof.

This is illustrated by FIG. 4A which constitutes a chart of phase shift angles which may be imparted to each of the radiators of a planar array. In this chart, H represents the phase shift incidental to horizontal or azimuth steering of the beam. Thus, concentrating first on the H values alone, it will be noted that in each of the vertical columns this component of the angular phase shift differs from that in any adjacent column by the value H. It will be understood from the explanation in connection with FIG. 3, that such sequential selective phase shifting will impart direction to the beam in a horizontal plane.

Attention is now directed to the component of phase shift angles incidental to steering in the vertical direction, or in elevation. Such values have been represented as a function of angle V. Focusing attention on the respective rows, it will be noted that this component of phase shift for each radiator increases sequentially from row to row. Thus, this component of angular phase shift varies between any adjacent rows by an amount of V. Again, with reference to FIG. 3, it will be appreciated that such successive phase shifting will result in beam steering in a vertical plane.

Thus, with respect to any row, values of phase shift attributable to azimuth steering increase linearly, i.e., H, 2H, 3H, 4H, etc.; values attributable to elevational steering vary linearly in any column, i.e., V, 2V, 3V, 4V, etc. Combining horizontal and vertical components of proper magnitude results in phase shift angles appropriate for steering the composite beam in space.

To illustrate further, the chart of FIG. 4B is presented to show the angular phase shift of individual radiated signals where it is assumed for simplicity that H equals V equals 5°. A study of this chart will reveal that the phase shift of each radiator differs by a predetermined increment from any adjacent radiator.

Spacing of adjacent dipoles, although not critical, is a compromise between the amount of angular phase shift necessary to position the composite beam as desired and the number of radiators that can be accommodated in a given size array. In other words the distance $x$ in FIG. 3, which is a determinant of the necessary phase shift for beam angle $\theta_1$, is directly related to the distance $k$ between radiators. Obviously, the larger $k$ becomes, the larger the array becomes for a given number of radiators, or the smaller the number of radiators that can be accommodated in a given size array. Spacing of adjacent radiators at approximately .55 of a wave length has proven desirable.

The spacing between the dipoles and reflecting surface also represents a compromise, in this case between the realizable band width and the forward gain. The closer the dipoles are to the reflecting surface, the better is the forward gain, but the narrower is the band width, down to a spacing of one-tenth wave length. Dipole spacing at one-quarter wave length from the reflector has been found to represent a favorable compromise.

As illustrated in FIG. 1, the reflector comprises metal mesh. Obviously, the strength of the reflector must be appropriate to the particular antenna structure in view of the use contemplated. The mesh size is also made appropriate to the range of radiated frequencies to assure reasonably efficient reflection at minimum cost and weight.

*Radiator assembly*

Figure 5:
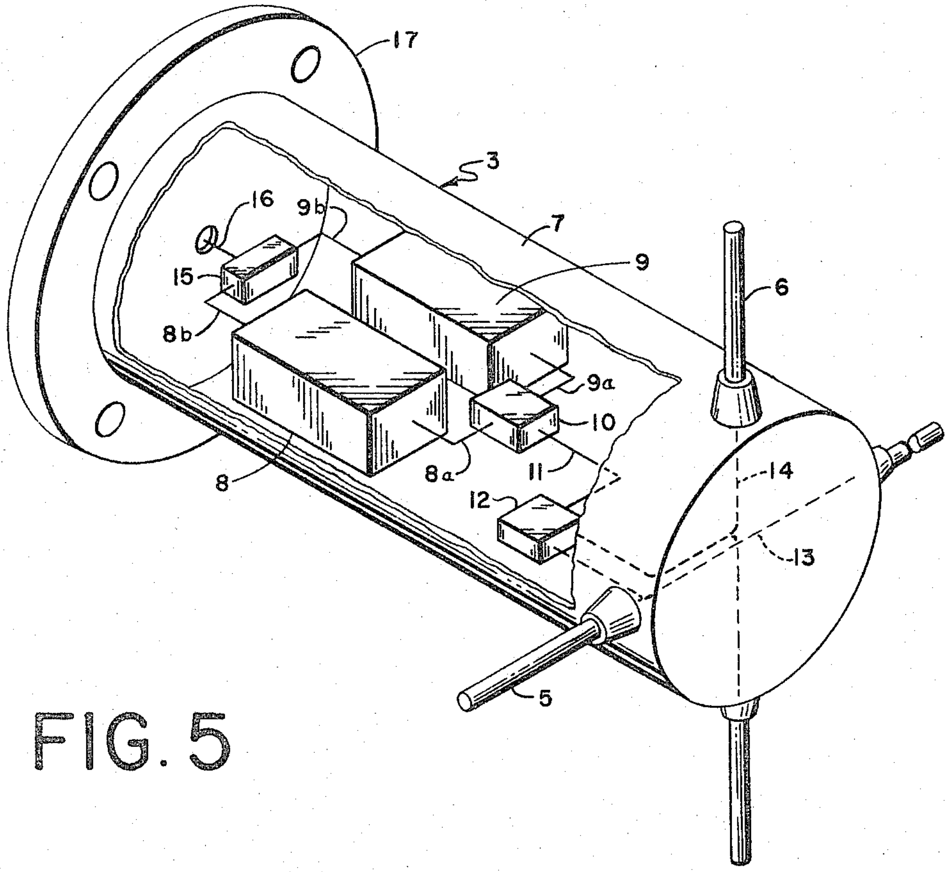
FIG. 5 is a pictorial representation of an individual radiator, such as employed in the antenna array shown in FIG. 1.

FIG. 5 shows the structural arrangement of an individual radiator assembly. Each assembly includes a horizontal dipole 5 and a vertical dipole 6, supported by cylinder 7 which houses receiver 8 and transmitter 9. The receiver and transmitter are connected by conductors 8*a* and 9*a* to T-R switch 10 which is connected through conductor 11 to double pole, double throw switch 12. This switch is connected through conductors 13 and 14 to dipoles 5 and 6 respectively; thus the position of switch 12 determines which of the dipoles will be excited. The receiver and transmitter are also connected by conductors 8*b* and 9*b* to T-R switch 15 through which connection is made to driving conductor 16.

Cylinder 7 is rigidly secured to flange 17 by means of which the radiator assembly may be secured to support 1 (see FIG. 1).

Although each radiator includes both a horizontal and a vertical dipole, in accordance with the preferred embodiment only one of the dipoles is energized for transmission or receiving purposes at one time. All of the switches 12, which may be fast acting remote controlled switches, are activated to simultaneously energize either all of the vertical, or all of the horizontal dipoles, of the entire array. Rapid shifting from one set of dipoles to the other may be necessary because of signal rotation between transmit and receive times due to weather, ionisphere penetration, target conditions and similar factors.

The crossed dipole arrangement, however, is only one of many that may be used with this invention. For instance, circular polarization would require that both dipoles be used simultaneously 90° out of phase.

It is important to note that each radiator assembly includes its own transmitter and receiver. Each transmitter 9 includes a radio frequency amplifier of appropriate frequency and bandwidth and may deliver approximately 10 to 20 kilowatts peak power for pulse operation and 100 watts for CW operation at 40 to 60 decibel gain. Thus, in a large array having an aperture of 100 x 200 ft., a total power of 400 megawatts of peak pulsed power may be radiated for long distance detection. This enormous power output can be attained through use of small presently available circuit components in a multiplicity of individual transmitters incorporated in the radiator assemblies.

*Electro-mechanical phase control*

Figure 6:
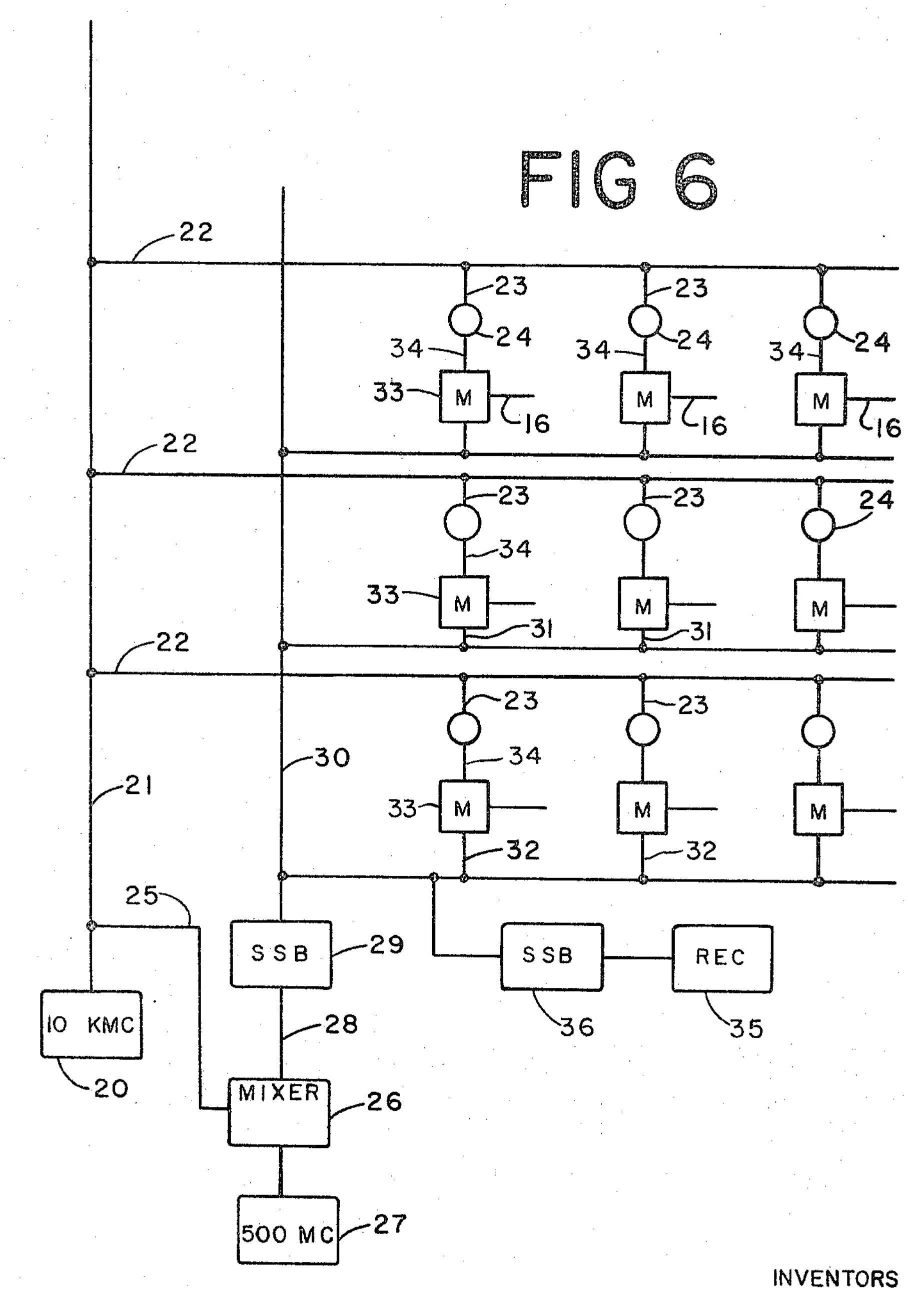
FIG. 6 is a block diagram illustrating an electromechanical system for transmitting and receiving a plurality of phase shifted signals.

Attention should now be directed to the block diagram of FIG. 6 which illustrates an organization of components for exciting the individual radiator assembiles for beam transmission and steering as desired. The components of the system are in themselves standard and for this reason will not be described in any detail, although a mechanical phase shifter which comprises one type of system component, is shown in FIG. 7 and will be described briefly.

A 10,000 megacycle (10K mc.) microwave generator, shown at 20, is connected through conductors 21, 22 and 23 to a plurality of mechanical phase shifters 24. The output from generator 20 is also supplied through conductor 25 to mixer 26. Also supplied to the mixer is the 500 megacycle (500 mc.) output signal of microwave generator 27.

Mixer 26 functions in a conventional manner and delivers to conductor 28 the sum and difference of the input signals, i.e., 9.5K mc. and 10.5K mc. These pass through single side band filter 29 which eliminates one of the side band frequencies, for example, the 10.5K mc. side band, leaving the 9.5K mc. side band which is supplied through conductors 30, 31 and 32 to a plurality of mixers 33. Mechanical phase shifters 24 are also connected to these mixers through conductors 34.

Although the 9.5K mc. side band is supplied to each and every mixer 33 with the same phase relationship, and the 10K mc. signal from generator 20 is supplied to each and every phase shifter 24 with the same phase relationship, each phase shifter 24 may be individually and differently adjusted to shift the signal which it supplies to its associated mixer 33. The 9.5K mc. signal is subtracted in each mixer 33 from the phase shifted 10K mc. signal supplied through the associated phase shifter. The resultant from each mixer 33 is a phase shifted 500 mc. signal which is supplied through associated driving conductor 16 to its associated individual radiator assembly. Thus, through use of the foregoing system, a phase shifted 500 mc. signal can be selectively supplied to each transmitter of each individual radiator assembly.

It will be noted that the microwave generator 20 supplies its output to both the phase shifters and the mixer 26 in which the 500 mc. signal from generator 27 is combined to form the side band frequency which is later subtracted from the phase shifted 10K mc. signal in mixer 33. Because it represents a common source of signals eventually heterodyned in mixer 33, frequency variation of the generator 20 does not affect the frequency of the signals eventually radiated from the dipoles.

For convenience, the 10K mc. signal may be termed the "steering signal" and the 500 mc. signal may be termed the "radiated signal," being the signal which is eventually transmitted.

Master receiver 35 and single side band filter 36 are connected to receive an in-phase signal from the phase shifters and associated circuits during the time that the antenna is adapted to receive signals.

Attention is now directed to FIG. 7, which shows a mechanical phase shifter 24 which comprises a hollow metallic cylinder 40 in which are rotatably positioned a pair of turnstile antennas 41 and 42. Conductor 23 is connected to antenna 41, whereas conductor 34 is connecter to antenna 42. Gearing 43 and 44 are provided for imparting rotation to the antennas to effect angular movement relative to each other, resulting in a phase shift in the signal transmitted therebetween.

Figure 8:
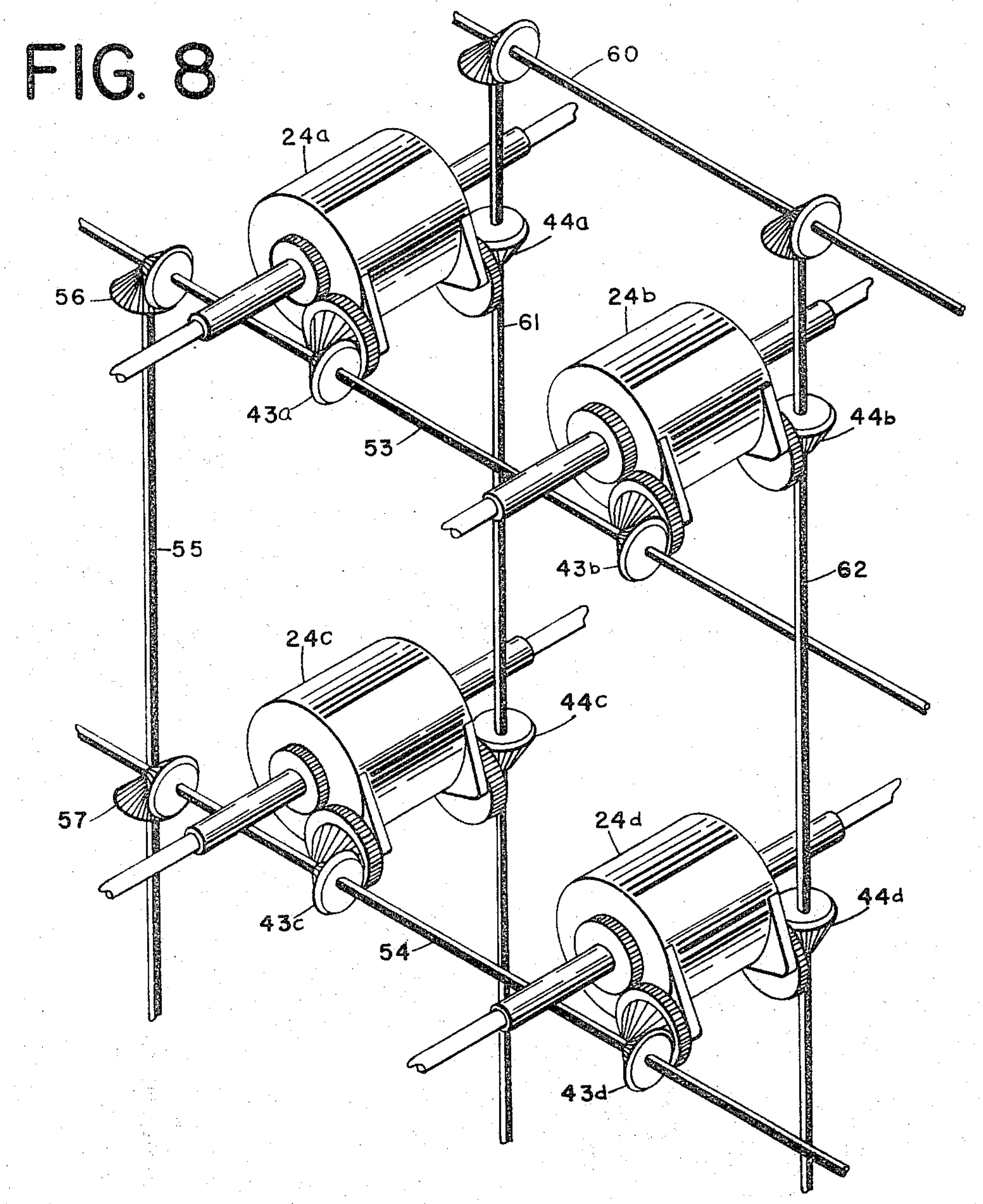
FIG. 8 is a schematic representation of mechanical elements for selectively adjusting a plurality of phase shifters, such as shown in FIG. 7.

Simultaneous control of the plurality of phase shifters shown in FIG. 6 may now be considered with reference to FIG. 8. For convenience, each of the phase shifters is individually identified in FIG. 8, as 24*a*, 24*b*, 24*c*, etc. Associated with the phase shifters are gears 43*a* and 44*a*, 43*b* and 44*b*, etc., respectively. Through these gears the turnstile antennas of the phase shifters are rotated as required to effect the desired phase shift, as has been explained. To simplify an understanding of the adjustment of the phase shifters, it is suggested that they be visualized as arranged in positions comparable to the array of radiator assemblies with which they are associated, i.e., phase shifter 24*a* phase shifts the signal supplied to the radiator assembly at the upper left corner of the array, phase shifter 24*b* shifts the signal of the radiator to the right of the corner radiator, etc.

All gears 43*a*, 43*b*, etc. in one horizontal row may be interconnected through a common shaft 53. Gears 43*c*, 43*d*, etc. of the next horizontal row are also interconnected through a common shaft 54. Shafts 53 and 54, in turn, may be driven by shaft 55 through gears 56 and 57. Thus, rotation of shaft 55 results in simultaneous rotation of shafts 53 and 54; however, it is important to note that the gear ratio of the gears 43*a* is 1:1 whereas it is 1:2 for gears 43*b*. In a similar manner, the gear ratio of gears 43*c* and 43*d* have a ratio of 1:1 and 1:2, respectively. Therefore, although identical rotation of shafts 53 and 54 results from rotation of shaft 55, the phase shift of the phase shifters in any one row associated with any one shaft, such as 53, varies linearly or progressively in the ratios of 1:1, 1:2, 1:3, etc. It should be understood that these gear ratios are only exemplary and any linear progression of ratios may be used depending upon dipole spacing. Occasionally non-linear ratios can also be used to distort the wave front and shape the beam.

In view of the progressive phase shift along each horizontal row, it will be clear that shaft 55 can be used for purposes of azimuth control. The progressive phase shift along a horizontal line of radiators is indicated in FIG. 4A by the linerally increasing values of the H components of the phase shift angles H, 2H, 3H, 4H, etc.

Elevational control is accomplished in essentially the same manner through the use of shaft 60, which is geared to shafts 61 and 62. These latter shafts are connected through gears 44*a*, 44*c*, etc. of progressively higher ratio to the phase shifters in a given column. Here, for purposes of illustration, the gear ratio of 44*a* may be taken as 1:1, while that of 44*c* is 1:2, and the gear ratio of the following phase shifter (not shown) is 1:3. The same progression of gear ratios would pertain with respect to gears 44*b*, 44*d*, etc, in connection with the shaft 62. It follows that for a given rotation of shaft 60, each phase shifter in a vertical row effects a progressively larger angular phase shift which is indicated in FIG. 4A by linearly progressive values of V in each column, i.e., V, 2V, 3V, 4V, etc.

The combined operation of shafts 55 and 60 results in a pattern of phase shift angles as indicated in FIGS. 4A and 4B. By suitable manipulation of these two shafts, the beam may be made to execute any desired scanning pattern.

*Electronic phase shifting networks*

Figure 9:
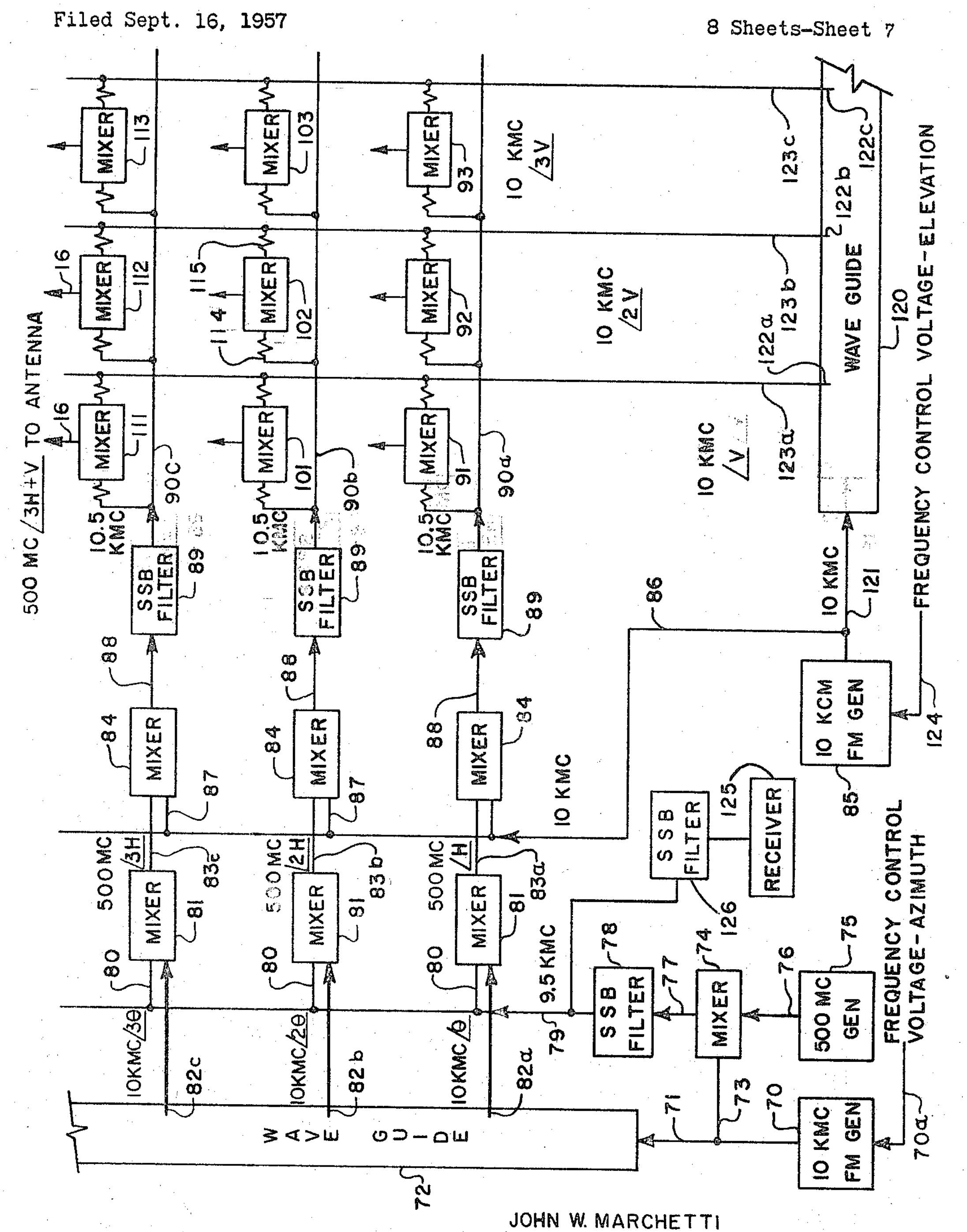
FIG. 9 is a block diagram illustrating a fully electronic control system for transmitting and receiving a plurality of phase shifted signals.

Attention is now directed to FIG. 9 which shows a purely electronic system for selectively phasing the signals for beam steering. The system involves no moving parts and, having no inertia, makes possible substantially instantaneous change in beam direction. The overall operation of the system is to deliver progressively phased 500 mc. signals to each of the radiator assemblies to form a pattern such as illustrated in FIGS. 4A and 4B and to steer it in space.

In FIG. 9, a 10K mc. generator is shown at 70 connected by conductor 71 to a wave guide 72. The signal from generator 70 is also supplied through conductor 73 to mixer 74. A 500 mc. signal from generator 75 is also supplied by conductor 76 to mixer 74. In a manner similar to that previously described, the mixer produces side bands of 9.5K mc. and 10.5K mc. which are supplied through conductor 77 to single side band filter 78 which is designed to remove one of the side bands, which for purposes of illustration, will be assumed to be the 10.5K mc. side band, leaving the 9.5K mc. side band which is supplied to conductor 79 and through branch lines 80 to a plurality of mixers 81. To these mixers are also supplied phase shifted 10K mc. steering signals from the wave guide 72. Phase shift of the 10K mc. signal is accomplished through physical spacing of probes 82*a*, 82*b*, 82*c*, etc. along the length of the wave guide. It will be clear to those skilled in the art that the amount of phase shift effected by the successive probes is a function of the frequency of the wave form passing through the wave guide. This fact is used to control phase shift. To take advantage of this fact, generator 70 may be varied in output frequency through application of a control voltage through conductor 70*a*, but may be considered to have a center frequency of 10K mc.

The 9.5K mc. signals are subtracted from the phase shifted 10K mc. steering signals in mixers 81, resulting in 500 mc. signals being passed to conductors 83*a*, 83*b*, 83*c*, etc., each signal having the same phase shift as the phase shifted steering signal from which it was derived. Thus, the phase shift effected by the wave guide is preserved and the signals in lines 83*a*, 83*b*, and 83*c* are similarly phase shifted as supplied to mixers 84.

To these mixers are also supplied 10K mc. signals from another 10K mc. generator 85, which is connected to the mixers through conductors 86 and 87. The output of mixers 84 are 9.5K mc. and 10.5K mc. signals which are supplied through conductors 88 to single side band filters 89. These filters may remove either of the side bands and, for purposes of illustration, may be considered to deliver 10.5K mc. phase shifted signals to conductors 90*a*, 90*b* and 90*c*.

Since 500 mc. phase shifted signals are received through conductors 83*a*, 83*b*, 83*c*, etc., the mixers 84 produce sum and difference frequencies reflecting the same phase shifts.

Conductor 90*a* is connected to each of a plurality of mixers 91, 92 and 93, whereas conductor 90*b* is connected to mixers 101, 102, and 103. In a similar fashion, conductor 90*c* is connected to mixers 111, 112 and 113. For clarity, these mixers are arranged in vertical and horizontal rows corresponding to the array of radiator assemblies and each mixer is connected, as by a driving conductor 16, to one such associated radiator assembly.

In addition to the 10.5K mc. phase shifted signals delivered to these mixers, there is also delivered a 10K mc. phase shifted signal obtained from a second wave guide 120 to which the 10K mc. signal from generator 85 is delivered through conductor 121. Here again, probes 122*a*, 122*b* and 122*c* are physically spaced along the wave guide to phase shift signals eventually delivered to associated conductors 123*a*, 123*b* and 123*c* Again, the phase shift is a function of the frequency of the signals derived from generator 85, which may be controlled by a frequency control voltage applied through conduit 124.

The conductor 123*a* is connected to mixers 91, 101 and 111, while the conductor 123*b* is connected to mixers 92, 102 and 112. Similarly, conductor 123*c* is connected to mixers 93, 103 and 113. In these mixers, the various signals are subtracted leaving a 500 mc. output signal from each mixer having a total phase shift originally derived from both wave guides 72 and 120. By proper positioning of the probes in the wave guides and arrangements of the mixers 91–113, a pattern of phase shifted signals can be obtained such as shown in FIG. 4A.

Attenuators 114 and 115 are provided at the inputs of each mixer 91–113 to prevent the phase shift of any one row or column of the matrix of mixers from affecting that of any other row or column.

A parallel with the previously described electromechanical system will be noted: Output signals of each radiator assembly reflect two components of angular phase shift, i.e., that for vertical and that for horizontal beam steering. Thus, variation of output frequency of generator 70, and the resultant phase shifts from wave guide 72, may be used for azimuth control; and variation of frequency from generator 85, and the resultant phase shifts from wave guide 120, may be used for elevational control.

It should be emphasized that beam steering may be effected almost instantaneously simply by variation of control potential in conductors 70*a* and 124 connected to generators 70 and 85.

A master receiver 125 and single side band filter 126 are also provided in the system of FIG. 9 for receiving in-phase signals from conductor 79 during receiving periods.

Through use of microwave steering signals, the physical size of components, such as the mechanical phase shifters and wave guides, can be held to a minimum. This is of great importance since an antenna array of the type set forth may involve over 20,000 separate radiator assemblies, and sequential phase shift of signals being supplied to more than 100 radiator assemblies in a given row or column may be necessary The frequency of the radiated signal is chosen on the basis of radar considerations and represents a compromise of power, gain, transmission efficiency under adverse weather conditions, physical dimensions of the components and physical size of the array. Although other frequencies than 500 mc. could be used, this represents a practical compromise. After this frequency is established, the steering frequency should be chosen so that the sum and difference of the steering and radiated frequencies are relatively far removed from the radiated frequency.

Figure 10:
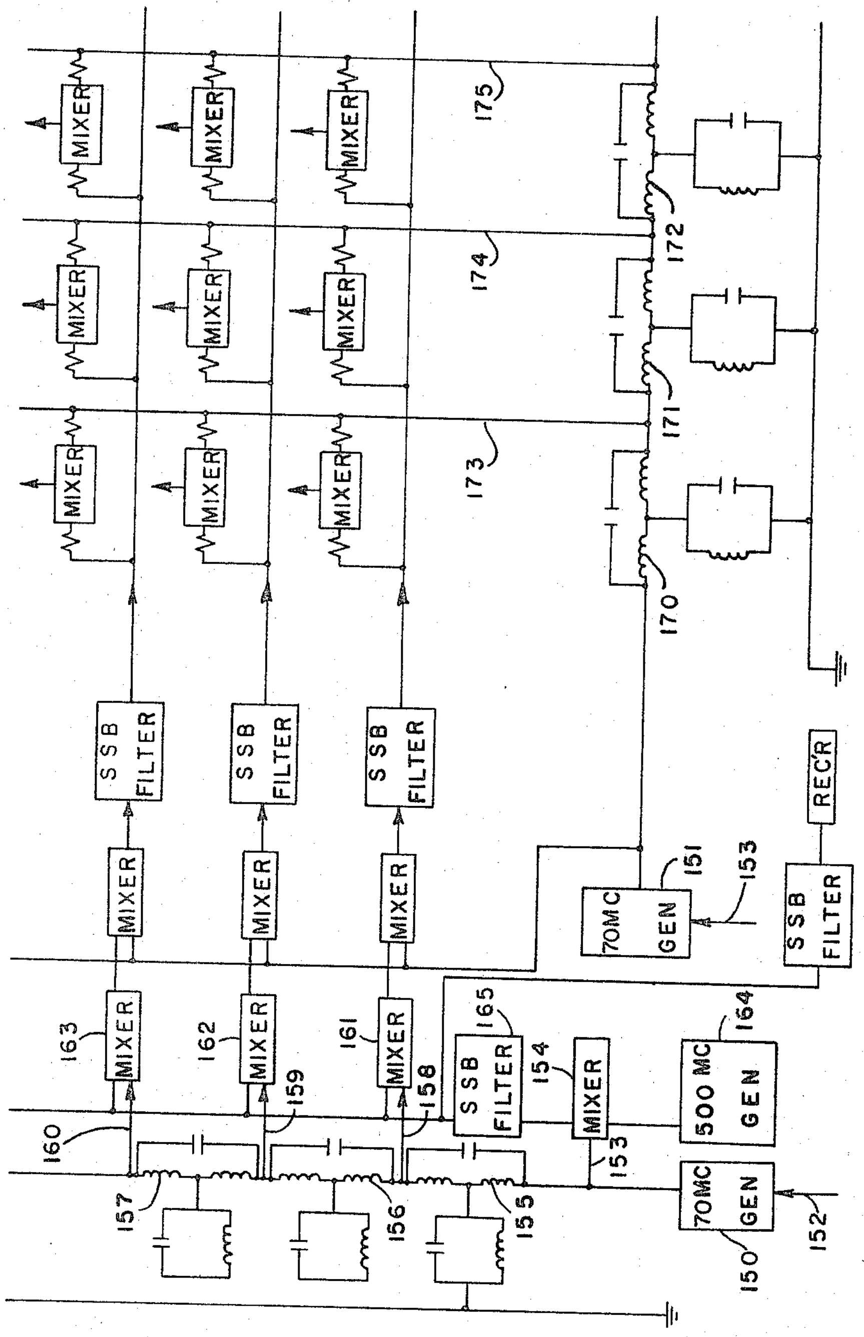
FIG. 10 is a block diagram illustrating a low frequency phase delay network which may be used in lieu of the system illustrated in FIGS. 6 and 9.

Lumped parameter phase delay networks can also be used to phase signals delivered to the radiator assemblies, as indicated in FIG. 10. Here, the generators 70 and 85 shown in FIG. 9 have been replaced by variable frequency generators 150 and 151 operating at nominal frequencies of 70 mc. Frequency of these generators may be controlled by application of D.C. control voltages through conductors 152 and 153.

Focusing attention first on generator 150, its output is supplied through conductor 153 to mixer 154, as well as to a series of bridged-T delay networks 155, 156 and 157. Phase delayed signals from these delay networks are supplied through conductors 158, 159 and 160 to a plurality of mixers 161, 162 and 163, respectively. In this circuit, as in previous circuits, a 500 mc. generator 164 is again provided to supply signals to mixer 154. The difference of the signals resulting from heterodyning in the mixer is supplied through conductor 165 to the plurality of mixers 161, 162 and 163 in much the same fashion, and with essentially the same result, as described with reference to FIG. 9.

Similarly, a plurality of bridged-T delay networks 170, 171 and 172 may be connected to the 70 mc. generator 151, resulting in a sequential, phase-shifted series of signals supplied to the plurality of conductors 173, 174 and 175. The remainder of the system is essentially the same as described in FIG. 9 and the result is a plurality of signals, sequentially phase shifted for azimuth and elevation, which are selectively supplied to the plurality of driving conductors 16.

Use of the system shown in FIG. 10 makes it possible to avoid handling of high frequency signals should this be deemed desirable in particular installations; instead, relatively low frequency delay networks, having conventional lumped parameters may be utilized.

With reference to all of the phase shift systems illustrated only a limited number of phase shifters have been shown. It should be understood that the number can be multiplied at will, employing essentially the same principles as those described, to adapt the systems for use with antenna arrays having any reasonable number of radiator assemblies.

It is also of basic importance to recognize that phase shift is accomplished in all of the systems without variation of the frequency of the signal which is radiated. For example, as described with reference FIG. 9, the frequency of the 10K mc. generator 70 is intentionally varied to effect phase shift in wave guide 72; but despite this variation of frequency, the frequency of the signal supplied by generator 75 remains essentially constant and is phase shifted by the system for eventual transmission at its original frequency by the radiator assemblies. It follows that beam steering, which is a function of phase shift, can be accomplished without varying the frequency of the radiated signal. It also follows from the nature of the system that the radiated frequency can be varied, as may be desired for anti-jamming purposes, without influencing steering frequencies or beam steering. This represents a very significant advantage over many of the prior art devices where steering and radiated frequencies are unalterably interdependent. Such is not the case in this invention, the composite beam of radiant energy can be steered at will, or directed at any fixed or moving target for tracking purposes, without dependence or influence upon the radiated signal.

In view of the provision of a separate transmitter for each radiator assembly, the overall antenna array is capable of transmitting an enormously powerful beam for searching vast reaches of space. Another advantage of the plurality of separate transmitters and receivers associated with the radiator assemblies is that jamming of the array is quite difficult. Since any one amplifier of a radiator assembly can see the jammer with an antenna gain of a single dipole or radiator, it is difficult, if not impossible, for the jammer to block the amplifier of the master receiver with strong signals. The relatively large size of the array also makes possible a sharply defined pencil beam within which jamming equipment must be located to jam the system.

The large field strength of the beam also makes this invention ideally suited for scatter link propagation, since communication around the curvature of the earth due to beam scattering in the troposphere is possible with such a powerful highly directed beam of radiant radio frequency energy.

Since each of the radiator assemblies includes a transmitter and a receiver, heat from such equipment is distributed over the full extent of the array. This not only aids in dissipating heat generated by the equipment, but also provides a heat source for de-icing the array during cold weather. The reflector also aids in dissipating the heat.

From the foregoing description of the invention, it will be appreciated that a novel and improved steerable antenna, and method of cooperating such an antenna are provided for radar and communication purposes. Values of frequency and power are exemplary and should not be construed as limitations of the invention.

Having described a preferred embodiment of our invention, we claim:

1. A radiator asembly for use in an antenna array comprising a cylindrical housing, a pair of mutually perpendicular dipoles supported by said housing adjacent one end thereof, a mounting flange secured to said housing at the opposite end thereof, a transmitter and a receiver within said housing, a pair of transmit-receive switches associated with said transmitter and said receiver, a driving conductor connected to one of said transmit-receive switches for delivering a signal to and receiving a signal from said switch, and a control switch connected to said other transmit-receive switch for connecting it to either one of said dipoles.

2. A radiator assembly comprising a cylindrical housing, a pair of mutually perpendicular dipole antennas supported by said housing adjacent one end thereof, mounting means secured to said housing at the opposite end thereof, transmitting and receiving equipment within said housing, and switching means for alternately interconnecting said transmitting and receiving equipment to one of said dipoles.

3. In combination with an antenna array having a plurality of individual radiators aligned in rows and columns, an electronic control circuit comprising a frequency-modulated microwave generator, a wave guide including a plurality of spaced probes connected to receive signals from said generator, said probes intercepting said signals at spaced intervals resulting in successive phase shift of the signals as received by the probes, a constant frequency signal generator, a mixer connected to said first and second-named generators, for intermodulating signals received therefrom, a single side band filter for blocking all but one intermodulation signal from said mixer, a plurality of mixers equal in number to the number of rows of radiators in the antenna, each of said mixers being connected to receive the intermodulation signal from said filter and also one of the phase shifted signals from said probes, a second frequency-modulated microwave generator, a second wave guide connected to receive signals from said second microwave generator and having a plurality of spaced probes for intercepting the signals and successively phase shifting them, a second plurality of mixers equal in number to said first-mentioned plurality, each mixer of said second plurality being connected to one mixer of said first plurality for intermodulating its signals with signals received from said second-named microwave generator, a plurality of single side band filters for blocking all but one of the intermodulation signals from said second-mentioned plurality of mixers, and a third plurality of mixers equal in number to the number of individual radiators of the antenna array, each of said third plurality of mixers being directly connected to a radiator, said mixers being electrically arranged in rows and columns to correspond to the positioning of the radiators, all of the mixers in a given row receiving a signal from one of said plurality of last-named single side band filters, and all of the mixers in a column receiving a signal from one of said probes in said last-named wave guide, said third plurality of mixers intermodulating the signals from said plurality of single side band filters and said second-named wave guide for producing phase shifted signals for the radiators, the phase shift being successive along each row and column of the antenna.

4. In combination with a planar antenna array including radiator assemblies arranged in rows and columns, means for producing a plurality of phase shifted signals corresponding in number to the number of rows, means for producing a plurality of phase shifted signals corresponding in number to the number of columns, a plurality of mixers corresponding to the number of radiator assemblies and arranged electrically in corresponding rows and columns, the output of each mixer of said plurality being connected to an individual radiator assembly, each of the phase shifted signals from said first-mentioned means being supplied to all of said mixers in a given row, each of the signals from said second mentioned means being supplied to all of said mixers in a given column, the intermodulated signals from each of said mixers having a total phase shift corresponding to the aggregate of the phase shift of the signals delivered to it, whereby the signals supplied to each radiator assembly are phase shifted with respect to those supplied to every other radiator assembly, imparting directional control for the composite beam of energy radiated by the array.

5. In combination with an antenna array comprising individual radiator asemblies, each radiator assembly including receiving and transmitting equipment and transmit-receive switches connected to the equipment to adapt it for receiving and transmitting signals alternately, an electronic control circuit comprising a microwave generator, means connected to said generator for producing a plurality of successively phase shifted signals of generator frequency, a radiated signal generator, a mixer connected to said first and second-named generators for intermodulating signals received therefrom, a single side band filter for blocking all but one intermodulation signal from said mixer, a plurality of other mixers, each connected to receive the intermodulation signal from said filter and also one of the phase shifted signals from said first-named means, a second microwave generator, a second phase shifting means connected to said second microwave generator for producing a plurality of phase shifted signals at the frequency of said second microwave generator, a second plurality of mixers equal in number to said first plurality, each mixer of said second plurality being connected to said second microwave generator and to one mixer of said first plurality for intermodulating its signals with those received from said second microwave generator, a plurality of single side band filters for blocking all but one of the intermodulation signals from said second plurality of mixers, a third plurality of mixers connected to the individual radiators of the antenna array, said third plurality of mixers receiving signals selectively from certain of said last-mentioned plurality of single side band filters and phase shifted signals from said last-mentioned phase shifting means, thereby producing phase shifted signals for the radiator assemblies reflecting the phase shift of both of said first and second named phase shifting means.

6. Apparatus as defined in claim 5 and, in addition, a single side band filter and a master receiver connected to receive composite in-phase signals from said first named plurality of mixers when the transmit-receive switches are positioned to adapt the radiator assemblies for receiving radiated energy.

7. In combination with an antenna array including a plurality of radiator assemblies, means for producing a plurality of phase shifted signals of radiated frequency, a microwave generator, a wave guide connected to receive signals from said microwave generator, said wave guide including a plurality of spaced probes for intercepting signals from said microwave generator at spaced intervals resulting in a plurality of successively phase shifted signals, a plurality of mixers, each of said plurality of mixers receiving a phase shifted signal of radiated frequency from said first-named means and a signal from said microwave generator, a plurality of filters connected to said plurality of mixers for blocking all but one of the intermodulated output signals from each of said mixers, the output signals from said filters having successive phase shifts corresponding to the phase shifts of the signals from said first-named means and having a frequency differing from that of the microwave generator by the amount of the radiated frequency, and another plurality of mixers each of which receives an intermodulated, phase shifted signal and a phase shifted signal from said wave guide, each of said last-named mixers intermodulating its received signals to produce a signal of radiated frequency embodying the phase shift of both said first-named means and said wave guide, said last-named mixers being connected to the individual radiator assemblies.

8. An electronic circuit for delivering a plurality of sequentially phase shifted signals to a steerable antenna array comprising a plurality of individual radiator assemblies aligned in mutually perpendicular rows and columns, a variable frequency generator, a wave guide connected to receive signals from said generator, a plurality of probes spaced along said wave guide for intercepting and phase shifting the signals from said generator, a mixer connected to each of said probes, a radiated signal generator, a mixer connected to said first and second-named generators for intermodulating their signals, a single side band filter connected to said second named mixer for filtering the intermodulated signals therefrom and supplying one such signal to each of said first-named mixers for intermodulation with the signals from said probes, said mixers yielding successively phase shifted signals at the frequency established by said radiated signal generator, said signals being delivered to successive rows or to successive columns of said array for elevational or azimuth steering, respectively, as may be desired.

9. A control circiut for an array of individual radiators comprising a plurality of mixers, each mixer being connected to an individual radiator, a plurality of electro-mechanical phase shifters, each phase shifter being connected to an individual mixer, a microwave generator, a radiated signal generator, another mixer connected to receive signals from said microwave generator and said radiated frequency generator, a single side band filter connected to said last-named mixer to block all but one intermodulation signal from said last-named mixer, said microwave generator being connected to each of said individual phase shifters, said single side band filter being connected to deliver to each of said first-mentioned mixers intermodulation signals having a frequency differing from that of the signals from said microwave generator by an amount equal to the frequency of said radiated signal generator, said phase shifters being individually adjustable to impart a predetermined phase shift to the signal from said microwave generator before it is delivered to its associated mixer, each of said first named mixers intermodulating the phase shifted signal and intermodulation signal from said single side band filter to produce a phase shifted signal of radiated frequency which is delivered directly to its associated radiator assembly.

10. Apparatus as defined in claim 9 in which transmitting and receiving equipment is provided for each individual radiator in addition to transmit-receive switches for adapting the radiators for transmitting and receiving alternately, and a master receiver and single band filter connected to receive signals from said plurality of mixers during the time that said transmit-receive switches adapt the radiators for receiving radiant energy.

11. In combination with a planar antenna array comprising a plurality of individual radiator assemblies aligned in rows and columns for radiating a signal of constant frequency, a mixer connected to each radiator assembly, an elector-mechanical phase shifter connected to each mixer, means for delivering a microwave signal of identical phase to each phase shifter, means for delivering a microwave signal of identical phase to each of said mixers, the frequency of said first-mentioned and second-mentioned microwave signals differing by the amount of the constant radiated frequency, means for simultaneously adjusting all of said phase shifters associated with said radiator assemblies in each column to produce successive phase shift of signals along each column, and means for simuletaneously adjusting said phase shifters associated with said radiator assemblies in each row to produce successive phase shift of signals along each row, said mixers modulating the microwave signals to produce signals of constant frequency having a total phase shift proportionate to the total adjustment of said associated phase shifters.

12. A lumped parameter control circuit for an antenna array comprising a frequency modulated generator, a plurality of bridged-T networks of progressively longer delay characteristics for producing a plurality of successively phase shifted signals having the frequency of said frequency modulated generator, a radiated signal generator, a mixer connected to said first and second named generators for intermodulating signals received therefrom, filter means for blocking all but one intermodulation signal from said mixer, the intermodulation signal differing from the frequency of said frequency modulated generator by an amount equal to radiated signal frequency, a plurality of other mixers, each of said plurality of mixers being connected to receive the intermodulation signal from said filter means and also one phase shifted signal from one of said bridged-T networks, a second frequency modulated generator, a second plurality of bridged-T networks of progressively longer delay characteristics for producing a plurality of phase shifted signals at the frequency of said second frequency modulated generator, a second plurality of mixers each connected to one mixer of said first plurality for intermodulating its output signals with those received from said second frequency modulated generator, a plurality of filter means for blocking all but one of the intermodulation signals from said second plurality of mixers, the intermodulation signals from said last named filter means embodying the phase shift of said first plurality of bridged-T networks and having a frequency differing from that of said second named frequency modulated generator by an amount equal to radiated signal frequency, and a third plurality of mixers connected to certain of said last named filter means and said last named plurality of bridged-T networks, said last named mixers intermodulating the signals from said last named filter means and said second named plurality of bridged-T networks to produce a plurality of signals of radiated frequency embodying the phase shift of the signals from said first and second named pluralities of bridged-T networks from which they were derived.

13. A lumped parameter control circuit for an array of radiators arranged in rows, said circuit comprising a plurality of bridged-T networks of progressively longer delay characteristics, a frequency modulated generator for supplying signals to said bridged-T networks, said networks producing a plurality of phase shifted signals at generator frequency, a generator for producing radiated signals, a mixer intermodulating the signals from said first- and second-named generators, a filter connected to said mixer to eliminate all but one intermodulation signal, a plurality of mixers corresponding to the rows of radiators, each mixer receiving a phase shifted signal from an associated bridged-T network and a filtered intermodulation signal from said first-named mixer at a frequency differing from that of the frequency modulated generator by an amount equal to the radiated signal frequency, the output of said plurality of mixers comprising successively phase shifted signals of radiated frequency for the rows of radiators.

14. An electronic control circuit for an antenna array comprising a microwave generator, phase shifting means connected to said generator for producing a plurality of successively phase shifted signals having the frequency of said microwave generator, a generator for radiated signals, a mixer connected to said first and second named generators for intermodulating signals received therefrom, filter means for blocking all but one intermodulation signal from said mixer, the intermodulation signal differing from the frequency of said microwave generator by an amount equal to the frequency of the radiated signal, a plurality of other mixers, each of said plurality of mixers being connected to receive the intermodulation signal from said filter means and also one phase shifted signal from said phase shifting means, a second microwave generator, a second phase shifting means for producing a plurality of phase shifted signals at the frequency of said second microwave generator, the output frequencies of said first and second microwave generators being substantially the same, a second plurality of mixers each connected to one mixer of said first plurality for intermodulating its output signals with those received from said second named microwave generator, a plurality of filter means for blocking all but one of the intermodulation signals from said second plurality of mixers, the intermodulation signals from said last-named filter means embodying the phase shift of said first named phase shifting means and having a frequency differing from that of said second named microwave generator by an amount equal to the frequency of the radiated signal, and a third plurality of mixers connected to certain of said last named filtering means and said second named phase shifting means, said last named mixers intermodulating the signals from said last named filter means and said second named phase shifting means to produce a plurality of radiated signals embodying the phase shift of the signals from said first and second named phase shifting means from which they were derived.

15. An electronic circuit for delivering a plurality of sequentially phase shifted signals of substantially constant frequency to an array of radiators aligned in rows and columns comprising means for producing a plurality of successively phase shifted constant frequency signals equal in number to the number of rows of radiators in the array, means for intermodulating a steering frequency with the phase shifted constant frequency to produce successively phase shifted intermodulation signals having a frequency differing from the steering signal by the amount of the constant frequency, means for producing a plurality of successively phase shifted signals of steering frequency equal in number to the number of columns of radiators, and a plurality of mixers, one for each radiator, for intermodulating the intermodulation frequency and the last named phase shifted steering frequency to produce a plurality of phase shifted constant frequency signals for the radiators embodying the phase shift of said first and last named means.

16. A control circuit for use with an antenna array having a plurality of individual radiators comprising means for generating a relatively constant frequency signal, heterodyning means for continuously and variably phase shifting said signal to produce a plurality of phase shifted signals at constant frequency, and means for delivering the phase shifted signals to the individual radiators of the antenna.

17. In combination in an antenna, a plurality of individual radiator assemblies, each of said assemblies including a transmitter, a receiver, and transmit-receive switches connected to said transmitter and said receiver of said assembly to adapt it for transmitting or receiving signals of radiant energy, a source of constant frequency signals, means for phase shifting the signals to produce a plurality of successively phase shifted signals of constant frequency, means for delivering the phase shifted signals to said transmit-receive switches of said individual radiators whereby each individual radiator may transmit a uniquely phase shifted signal at constant frequency.

18. Apparatus defining claim 17 and, in addition, a master receiver connected to said phase shifting means and adapted to receive an in-phase signal from said phase shifting means when said transmit-receive switches are positioned to adapt said individual radiators for receiving purposes.

19. In combination, a planar antenna array for radiating a beam of radiant energy comprising a plurality of individual radiators aligned in columns and rows, means for generating constant frequency signals, and heterodyning means for imparting an angular phase shift to the signals to produce a plurality of phase shifted signals one of which is supplied to each individual radiator, the amount of phase shift being successively greater with respect to the successive colums and successive rows of radiators, and means for modulating the phase shift of the signals supplied to the radiators whereby steering of the beam radiated by the antenna may be effected.

20. In combination with an antenna array comprising a plurality of individual radiators, means for generating a relatively constant frequency signal, heterodyning means for phase shifting said signal to produce a plurality of phase shifted signals at constant frequency, and means for delivering the phase shifted signals to the radiators of the antenna.

21. A method of steering a composite beam of radiant energy radiated by a planar antenna array having a plurality of individual radiators aligned in rows and columns, and a plurality of mixers individually connected to each of the radiators comprising supplying sucessively phase shifted signals to the mixers associated with the rows of radiators, every mixer associated with the radiators of a given row receiving a signal of predetermined given phase shift, supplying a plurality of phase shifted signals to the mixers associated with the columns of radiators, all of the mixers associated with a given column receiving signals of a given phase shift, the frequency of the first mentioned signals differing from the frequency of the second mentioned signals by an amount equal to the frequency of the signal to be radiated, intermodulating the first mentioned and second mentioned signals in the mixers to produce a plurality of individual signals for the individual radiators each embodying the phase shift of the individual signals which were supplied to the mixers, the output frequency of all mixers having the same frequency at any instant of time.

22. The method of steering the radiated beam of an antenna array having a plurality of individual radiator assemblies comprising modulating constant frequency signals with a steering frequency to produce signals differing from the steering frequency by the amount of the constant frequency, successively phase shifting the steering frequency to produce a plurality of individual phase shifted signals at steering frequency, mixing the phase shifted steering signals and those resulting from modulation of the steering frequency and constant frequency to produce a plurality of phase shifted signals at constant frequency, modulating the phase shifted constant frequency signals with steering signals from another source to produce phase shifted signals having a frequency differing from that of the second source of steering signals by an amount equal to the constant frequency, phase shifting the second steering signals to produce a plurality of individual phase shifted signals of steering frequency, mixing the last named phase shifted steering signals and the phase shifted signals differing from the frequency of the second source of steering signals by an amount equal to constant frequency whereby a plurality of phase shifted signals at constant frequency is produced embodying the phase shift created by the first and second phase shifting steps, and delivering the last named phase shifted signals to the individual radiator assemblies.

23. The method of steering a beam of radiant energy radiated by an antenna array having a plurality of individual radiators comprising generating a relatively constant frequency signal, phase shifting the signal to produce a plurality of phase shifted signals at constant frequency, and delivering the phase shifted signals to the individual radiators of the antenna, the amount of phase shift imparted to the signals being varied to steer the beam radiated by the antenna.

24. The method of steering the radiated beam of an antenna array having a plurality of individual radiator assemblies comprising modulating constant frequency signals with a steering frequency to produce signals differing from the steering frequency by the amount of the constant frequency, successively phase shifting the steering frequency to produce a plurality of individual phase shifted signals at steering frequency, mixing the phase shifted steering signals and those resulting from modulation of the steering frequency and constant frequency to produce a plurality of phase shifted signals of constant frequency, and delivering the phase shifted signals of constant frequency to the individual radiator assemblies.

25. An apparatus for producing a plurality of output signals, successive ones of said signals having variable equal phase differences, said apparatus comprising a delay line adapted to receive a variable frequency signal at one extremity thereof; means for providing output junctions at a plurality of uniformly spaced points along said delay line; a plurality of mixers, each one of said mixers corresponding to a different output junction along said delay line and having first and second input circuits and an output circuit; means for coupling each of said output junctions to the first input circuit of the mixer corresponding thereto; and means for applying a signal differing in frequency from said variable frequency by a predetermined number of cycles per second to the second input circuit of each of said plurality of mixers whereby said plurality of output signals are available at the output circuits of said plurality of mixers.

26. The apparatus as defined in claim 25 wherein said delay line constitutes a length of waveguide.

27. An apparatus for producing a plurality of output signals, successive ones of said signals having determinable phase differences, said apparatus comprising a delay line adapted to receive a variable frequency signal at one extremity thereof; means for providing output junctions at a plurality of spaced points along said delay line;

means for providing a source of signals, each of which is of the same phase and of a frequency which differs from said variable frequency by a predetermined number of cycles per second; and a plurality of means for mixing signals, individual ones of said signal mixing means being responsive to the signal available at the output junction corresponding thereto at a spaced point along said delay line and one of the signals provided by said source, thereby to produce said plurality of output signals.

28. A signal synthesizing system for developing a plurality of output signals having the same frequency with a variable but predetermined phase relationship comprising:

(a) a variable frequency signal generating means;
(b) a phase-shifting network coupled to said variable frequency signal generating means and responsive to signals received therefrom for developing a plurality of phase-shifted signals having a predeterminted phase relationship which is a function of the frequency of said variable frequency generating means;
(c) a plurality of mixers, each one of said mixers corresponding to an output signal from said phase-shifting means and having first and second input circuits and an output circuit, said first input circuit being coupled to said phase-shifting means;
(d) and means for supplying a signal differing in frequency from said variable frequency to said second input circuit of each of said plurality of mixers, whereby said plurality of output signals are available at the output circuits of said plurality of mixers.

References Cited by the Examiner

UNITED STATES PATENTS

| | | | |
|---|---|---|---|
| 2,041,600 | 5/1936 | Friis | 343—100 |
| 2,245,660 | 6/1941 | Feldman | 343—100 |
| 2,409,944 | 10/1946 | Loughren | 343—100 |
| 2,464,276 | 3/1949 | Varian | 343—100 |

CHESTER L. JUSTUS, *Primary Examiner.*

RODNEY D. BENNETT, *Examiner.*

R. E. BERGER, *Assistant Examiner.*